US012675543B2

(12) United States Patent
Gamshad et al.

(10) Patent No.: US 12,675,543 B2
(45) Date of Patent: Jul. 7, 2026

(54) OMNI-CHANNEL CONTENT MAPPER FRAMEWORK

(71) Applicant: Charles Schwab & Co., Inc, San Francisco, CA (US)

(72) Inventors: Mohsen Gamshad, San Francisco, CA (US); Satya Billa, San Francisco, CA (US); Chris Hister, San Francisco, CA (US); Vishu Kandi, San Francisco, CA (US); Nicky Joshi, San Francisco, CA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 0 days.

(21) Appl. No.: 18/333,444

(22) Filed: Jun. 12, 2023

(65) Prior Publication Data

US 2024/0411830 A1      Dec. 12, 2024

(51) Int. Cl.
| | |
|---|---|
| *G06F 16/958* | (2019.01) |
| *G06F 9/445* | (2018.01) |
| *G06F 16/95* | (2019.01) |

(52) U.S. Cl.
CPC ........ *G06F 16/986* (2019.01); *G06F 9/44526* (2013.01)

(58) Field of Classification Search
CPC ...... G06F 16/986; G06F 17/243; G06F 17/24; G06F 9/44526; G06F 9/4443
See application file for complete search history.

(56) References Cited

U.S. PATENT DOCUMENTS

| | | | | |
|---|---|---|---|---|
| 5,835,712 A | * | 11/1998 | DuFresne | ........... G06F 21/6227 709/219 |
| 6,185,587 B1 | * | 2/2001 | Bernardo | .............. G06F 40/166 707/E17.112 |
| 6,868,539 B1 | * | 3/2005 | Travison | ................... G06F 8/63 717/100 |

(Continued)

OTHER PUBLICATIONS

International Search Report and Written Opinion for International Application No. PCT/US2024/020707 mailed on Jul. 15, 2024.

*Primary Examiner* — Nicholas Augustine
(74) *Attorney, Agent, or Firm* — Harness, Dickey & Pierce, P.L.C.

(57) ABSTRACT

A system, apparatus, method, and non-transitory computer readable medium for providing an omni-channel content mapper framework may include a server caused to receive a content request from at least one user device, the content request including a unique content identifier associated with the requested content and desired content type information corresponding to the requested content, determine a desired content mapper (CM) plugin corresponding to the desired content type information from a plurality of CM plugins, obtain content data corresponding to the unique content identifier from a content database, generate an application-agnostic structured data document using the determined content mapper plugin, the application-agnostic structured data document including the obtained content data, and transmit the application-agnostic structured data document to the at least one user device in response to the content request.

17 Claims, 9 Drawing Sheets

(56) References Cited

U.S. PATENT DOCUMENTS

| | | | | |
|---|---|---|---|---|
| 7,051,031 B2* | 5/2006 | Schein | | G06F 9/52 |
| | | | | 707/697 |
| 7,194,678 B1* | 3/2007 | Koike | | G06F 16/972 |
| | | | | 709/224 |
| 7,458,021 B2* | 11/2008 | Balasubramanyan | | |
| | | | | G06F 40/186 |
| | | | | 715/236 |
| 7,461,340 B1* | 12/2008 | Mauceri, Jr. | | G06T 11/26 |
| | | | | 715/252 |
| 12,020,045 B1* | 6/2024 | Wilson | | G06F 9/44521 |
| 12,033,195 B1* | 7/2024 | Constantin | | G06F 40/143 |
| 2002/0019827 A1* | 2/2002 | Shiman | | G06F 16/93 |
| | | | | 707/999.009 |
| 2002/0073125 A1* | 6/2002 | Bier | | G06F 40/166 |
| | | | | 715/255 |
| 2002/0194194 A1* | 12/2002 | Fenton | | H04N 21/2743 |
| 2003/0172343 A1* | 9/2003 | Leymaster | | G06Q 20/40 |
| | | | | 715/234 |
| 2003/0233425 A1* | 12/2003 | Lyons | | H04L 67/02 |
| | | | | 709/217 |
| 2004/0003031 A1* | 1/2004 | Brown | | G06F 16/95 |
| | | | | 715/224 |
| 2004/0107405 A1* | 6/2004 | Schein | | G06F 9/52 |
| | | | | 709/200 |
| 2004/0243930 A1* | 12/2004 | Schowtka | | G06F 40/106 |
| | | | | 715/255 |
| 2005/0246283 A1* | 11/2005 | Gwiazda | | G06Q 10/10 |
| | | | | 705/52 |
| 2006/0235984 A1* | 10/2006 | Kraus | | G06F 40/174 |
| | | | | 709/228 |
| 2007/0129817 A1* | 6/2007 | Cadiz | | G06Q 10/107 |
| | | | | 700/17 |
| 2007/0136201 A1* | 6/2007 | Sah | | G06Q 99/00 |
| | | | | 705/51 |
| 2007/0250783 A1* | 10/2007 | Wu | | G06F 40/174 |
| | | | | 715/234 |
| 2008/0189617 A1* | 8/2008 | Covell | | H04L 67/02 |
| | | | | 707/999.009 |
| 2009/0172637 A1* | 7/2009 | Parikh | | G06F 8/60 |
| | | | | 717/114 |
| 2011/0161178 A1* | 6/2011 | Rosenstein | | G06Q 30/0273 |
| | | | | 705/14.69 |
| 2013/0091252 A1* | 4/2013 | Pizzorni | | H04L 69/329 |
| | | | | 709/219 |
| 2013/0332917 A1* | 12/2013 | Gaither | | G06F 8/656 |
| | | | | 717/170 |
| 2014/0047429 A1* | 2/2014 | Gaither | | G06F 9/44526 |
| | | | | 717/172 |
| 2015/0026658 A1* | 1/2015 | Jones | | G06F 9/4488 |
| | | | | 717/108 |
| 2015/0135206 A1* | 5/2015 | Reisman | | H04H 20/93 |
| | | | | 725/18 |
| 2015/0212989 A1* | 7/2015 | Rice | | G06F 16/986 |
| | | | | 715/234 |
| 2015/0310188 A1* | 10/2015 | Ford | | H04L 63/101 |
| | | | | 726/28 |
| 2017/0006135 A1* | 1/2017 | Siebel | | G06F 8/24 |
| 2017/0235848 A1* | 8/2017 | Van Dusen | | G06Q 10/10 |
| | | | | 705/12 |
| 2019/0236844 A1* | 8/2019 | Balasian | | G06F 3/0304 |
| 2021/0312008 A1 | 10/2021 | Dal Zotto | | |
| 2024/0069872 A1* | 2/2024 | Assenov | | G06F 9/44526 |

* cited by examiner

```
[
  {
    "role": "story",
    "identifier": "3731",
    "uuid": "769de997-54c5-438a-aa26-041d61141ad8",
    "language": "en",
    "moderationState": "published",
    "urlAlias": "/story/backdoor-roth-is-it-right-you",
    "hostName": "education.schwab.com",
    "title": "The Backdoor Roth: Is It Right for You?",
    "subtitle": null,
    "shortTitle": "The Backdoor Roth",
    "summary": "If your income is too high to contribute to a Roth IRA, there's
    another way in—but it comes with some caveats.",
    "duration": null,
    "excerpt": "",
    "displayDate": "2023-01-10",
    "lastPublished": "2023-01-13T23:40:43+00:00",
    "editorialType": "general-story",
    "featuredMedia": [
      {
        "role": "image",
        "uuid": "381fc175-c62e-4001-b20c-1c5b73038f21",
        "identifier": "10936",
        "caption": null,
        "title": "Getty_528168287_1x1",
        "url": "https://education.schwab.com/528168287.jpg",
        "altText": "null",
        "attribution": null,
        "aspectRatio": "1:1",
        "disclosure": null,
        "index": 0
      },
      {
        "role": "image",
        "uuid": "e6051f63-7b6c-4019-ae88-c91dc3fa0595",
        "identifier": "10931",
        "caption": null,
        "title": "Getty_528168287_2x1",
        "url": "https://xxx.jpg",
        "altText": "null",
        "attribution": null,
        "aspectRatio": "300:157",
        "disclosure": null,
        "index": 1
      },
      {
        "role": "image",
        "uuid": "73168aef-2d6d-4a97-af0c-b3c72243b765",
        "identifier": "10926",
        "caption": null,
        "title": "Getty_528168287_3x2",
        "url": "https://xxx",
        "altText": "null",
        "attribution": null,
        "aspectRatio": "3:2",
        "disclosure": null,
        "index": 2
      }
    ],
    "authors": [

],
    "contributors": [
      {
        "role": "person",
        "identifier": "181",
        "uuid": "4b27e885-e205-4e61-bac9-383834be663c",
        "language": "en",
        "urlAlias": "/author/rob-williams",
        "name": "Rob Williams",
        "firstName": "Rob",
        "lastName": "Williams",
        "image": {
          "title": "Robert Williams FINAL RETOUCHED_365x365.jpg",
          "url": "xxx.jpg",
```

FIG. 3B

```
          "altText": "Rob Williams"
        }
      }
    },
    "components": [
      {
 (5)    "role": "text",
        "text": "<p>A Roth individual retirement account (IRA) would seem to be off limits for many higher-income earners,
        thanks to strict income caps on contributions to these accounts. </p><p>But some advisors suggest another way into a
        Roth—if you're willing to take the backdoor route. By this method, you open a traditional IRA, make your desired contribution,
        and then, at a later date, convert the funds to a Roth IRA. </p><p>Could it really be that easy to sidestep restrictions that have
        kept many investors from enjoying a Roth IRA's tax advantages? This strategy has gained popularity with some higher-income
        earners, notes Rob Williams, managing director of financial planning, retirement income, and wealth management at the Schwab
        Center for Financial Research. But the IRS hasn't weighed in definitively on what's allowed, so it's helpful to understand some of
        the issues—and it's highly recommended that you work with a professional accountant or tax advisor, Rob says.</p>",
        "index": 0
      },
      {
 (6)    "role": "subheading",
        "text": "The appeal and limitations of a Roth",
        "level": "1",
        "index": 1
      },
      {
        "role": "text",
        "text": "<p>With a Roth IRA, you get no up-front tax deduction, as you do with a traditional IRA, 401(k) retirement plan, or other
        tax-deferred account. However:</p><ul><li>You pay no tax on either principal or earnings when you withdraw your money (although
        you must be at least age 59½ and have had the Roth for five years).</li>\t<li>There's no time requirement on when you <em>have
        </em>to withdraw money, if ever—an appealing option for those wanting to leave the money to heirs. </li></ul><p>The trouble has
        been, of course, that Roth IRAs technically are only available to those whose <a aria-label=\"\" data-track=\"\" href=\"https://www.irs.
        gov/retirement-plans/plan-participant-employee/retirement-topics-ira-contribution-limits\" target=\"_blank\">annual income is below
        certain levels</a>. </p><p>For the 2022 tax year, those limits are: </p><ul><li>$214,000 for married couples filing
        jointly</li>\t<li>$144,000 for single filers</li></ul><p>For the 2023 tax year, the limits are: </p><ul><li>$228,000 for married couples
        filing jointly</li>\t<li>$153,000 for single filers</li></ul><p>On the positive side, an increasing number of employers have added
        Roth options to 401(k) plans. You can choose this option and contribute post-tax payroll deductions into a <a
        aria-label=\"\" data-track=\"\" href=\"/story/should-you-consider-roth-401k\" target=\"\">Roth 401(k)</a>, with no income limits.</p>",
        "index": 2
      },
      {
 (7)    "role": "subheading",
        "text": "A two-step Roth conversion process",
        "level": "1",
        "index": 3
      },
      {
        "role": "subheading",
        "text": "Pay the tax due",
        "level": "1",
        "index": 5
      },
      {
        "role": "subheading",
        "text": "The backdoor Roth may not last forever",
        "level": "1",
        "index": 7
      },
 (8)  },
      "complianceCode": "0123-3NRD",
      "disclosure": "<p>The information provided here is for general informational purposes only and should not be considered an
      individualized recommendation or personalized investment advice. The investment strategies mentioned here may not be suitable
      for everyone. Each investor needs to review an investment strategy for his or her own particular situation before making any
      investment decision.</p><p>All expressions of opinion are subject to change without notice in reaction to shifting market conditions.
      Data contained herein from third-party providers is obtained from what are considered reliable sources. However, its accuracy,
      completeness or reliability cannot be guaranteed.</p><p>This information is not intended to be a substitute for specific
      individualized tax, legal or investment planning advice. Where specific advice is necessary or appropriate, Schwab recommends
      consultation with a qualified tax advisor, CPA, financial planner or investment manager.</p><p>Examples provided are for
      illustrative purposes only and not intended to be reflective of results you can expect to achieve.</p><p>Roth IRA conversions
      require a 5-year holding period before earnings can be withdrawn tax free and subsequent conversions will require their own 5-year
      holding period. In addition, earnings distributions prior to age 59 1/2 are subject to an early withdrawal penalty.</p><p>Prior to a
      decision of a IRA \"roll in\" to an employer's 401(k), be sure to understand the benefits and limitations of your available options and
      consider factors such as differences in investment related expenses, plan or account fees, available investment options, distribution
      options, legal and creditor protections, the availability of loan provisions, tax treatment, and other concerns specific to your
      individual circumstances.</p><p>The Schwab Center for Financial Research is a division of Charles Schwab & Co., Inc.</p>",
```

FIG. 3B
(CONT'D)

①  The Backdoor Roth: Is It Right for You?

⊠ January 9, 2023 ②

③  If your income is too high to contribute to a Roth IRA, there's another
way in—but it comes with some caveats.

④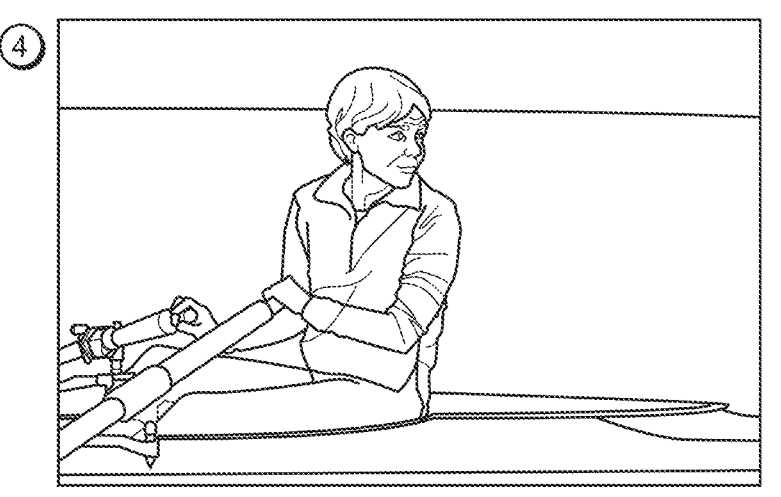

A Roth individual retirement account (IRA) would seem to be off limits for many higher-income
earners, thanks to strict income caps on contributions to these accounts.

⑤  But some advisors suggest another way into a Roth—if you're willing to take the backdoor route.
By this method, you open a traditional IRA, make your desired contribution, and then, at a later
date, convert the funds to a Roth IRA.

Could it really be that easy to sidestep restrictions that have kept
many investors from enjoying a Roth IRA's tax advantages? This strategy has gained popularity
with some higher-income earners, notes Rob Williams, managing director of financial planning,
retirement income, and wealth management at the Schwab Center for Financial Research.
But the IRS hasn't weighed in definitively on what's allowed, so it's helpful to understand some of the issues
—and it's highly recommended that you work with a professional accountant or tax advisor, Rob says.

⑥  The appeal and limitations of a Roth

With a Roth IRA, you get no up-front tax deduction, as you do with a traditional
IRA, 401(k) retirement plan, or other tax-deferred account. However:

You pay no tax on either principal or earnings when you withdraw your money (although you must be at
least age 59½ and have had the Roth for five years). There's no time requirement on when you have to
withdraw money, if ever—an appealing option for those wanting to leave the money to heirs. The trouble
has been, of course, that Roth IRAs technically are only available to those whose annual
income is below certain levels.

For the 2022 tax year, those limits are:

$214,000 for married couples filing jointly
$144,000 for single filers
For the 2023 tax year, the limits are:

$228,000 for married couples filing jointly
$153,000 for single filers
On the positive side, an increasing number of employers have added Roth options to 401(k) plans.
You can choose this option and contribute post-tax payroll deductions into a Roth 401(k), with no income limits.

⑦  A two-step Roth conversion process

FIG. 3C

Converting savings held in a traditional IRA into a Roth IRA is a two-step process:

Open a non-deductible traditional IRA and make after-tax contributions. For 2022, you're allowed to contribute up to $6,000 ($7,000 if you're age 50 or older). Make sure you file IRS Form 8606 every year you do this. Transfer the assets from the traditional IRA to a Roth IRA. You can make this transfer and conversion at any point in the future. Some advisors suggest waiting a few months after opening the Roth IRA.

Pay the tax due

The conversion triggers income tax on the appreciation of the after-tax contributions—but once in the Roth IRA, earnings compound tax-free. Distributions from the Roth IRA are tax-free as well, as long as you are 59½ and have held the Roth for at least five years (note that each conversion amount is subject to its own five-year holding period as it relates to tax-free withdrawals).

If you have no other IRAs, figuring out your tax due will be simple. However, it can be more complicated if you have other IRAs. The IRS' pro-rata rule requires you to include all of your traditional IRA assets—that means your IRAs funded with pretax (deductible) contributions as well as those funded with after-tax (nondeductible) contributions—when figuring the conversion's taxes. Then, you pay a proportional amount of taxes on the original account's pretax contributions and earnings.

Say you contribute $6,000 to a nondeductible traditional IRA. You also have a rollover IRA worth $94,000 from a previous 401(k) made with pretax contributions. In this case, 94% of any conversion would be taxable. Here's the math:

Total value of both accounts = $100,000
Pretax contributions = $94,000
After-tax contribution: $6,000
$6,000÷$100,000 (expressed as percentage) = 6.0%
$6,000 (the amount converted) x 6.0% = $360 tax-free
$6,000 - $360 = $5,640 subject to income tax
Note: If your 401(k) allows you to "roll in" an IRA account, as some do, you can essentially take your existing IRA out of the conversion calculation.

The information provided here is for general informational purposes only and should not be considered an individualized recommendation or personalized investment advice. The investment strategies mentioned here may not be suitable for everyone. Each investor needs to review an investment strategy for his or her own particular situation before making any investment decision.

All expressions of opinion are subject to change without notice in reaction to shifting market conditions. Data contained herein from third-party providers is obtained from what are considered reliable sources. However, its accuracy, completeness or reliability cannot be guaranteed.

This information is not intended to be a substitute for specific individualized tax, legal or investment planning advice. Where specific advice is necessary or appropriate, Schwab recommends consultation with a qualified tax advisor, CPA, financial planner or investment manager.

Examples provided are for illustrative purposes only and not intended to be reflective of results you can expect to achieve.

Roth IRA conversions require a 5-year holding period before earnings can be withdrawn tax free and subsequent conversions will require their own 5-year holding period. In addition, earnings distributions prior to age 59 1/2 are subject to an early withdrawal penalty.

Prior to a decision of a IRA "roll in" to an employer's 401(k), be sure to understand the benefits and limitations of your available options and consider factors such as differences in investment related expenses, plan or account fees, available investment options, distribution options, legal and creditor protections, the availability of loan provisions, tax treatment, and other concerns specific to your individual circumstances.

The Schwab Center for Financial Research is a division of Charles Schwab & Co., Inc.

0123-3NRD

FIG. 3C
(CONT'D)

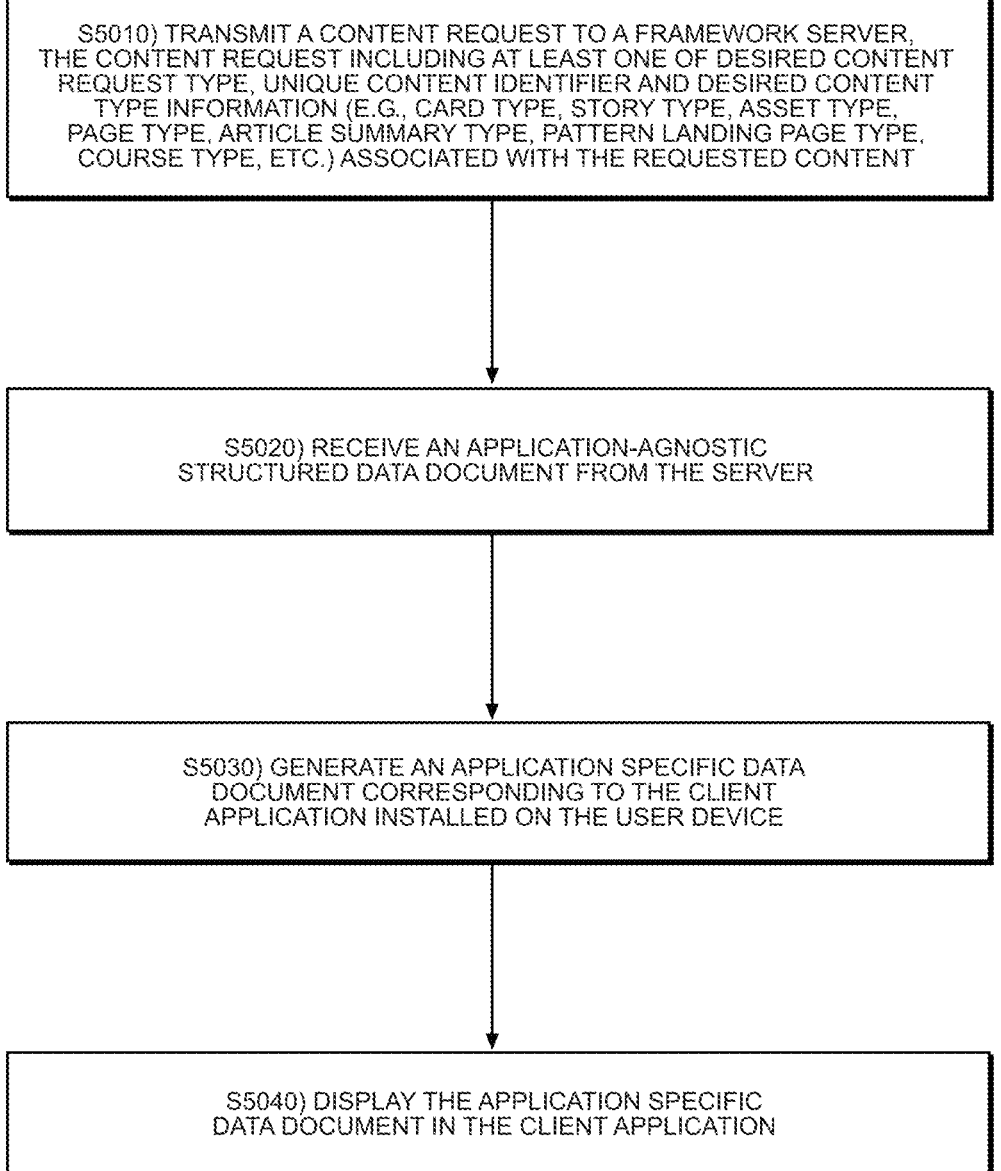

S5010) TRANSMIT A CONTENT REQUEST TO A FRAMEWORK SERVER, THE CONTENT REQUEST INCLUDING AT LEAST ONE OF DESIRED CONTENT REQUEST TYPE, UNIQUE CONTENT IDENTIFIER AND DESIRED CONTENT TYPE INFORMATION (E.G., CARD TYPE, STORY TYPE, ASSET TYPE, PAGE TYPE, ARTICLE SUMMARY TYPE, PATTERN LANDING PAGE TYPE, COURSE TYPE, ETC.) ASSOCIATED WITH THE REQUESTED CONTENT

S5020) RECEIVE AN APPLICATION-AGNOSTIC STRUCTURED DATA DOCUMENT FROM THE SERVER

S5030) GENERATE AN APPLICATION SPECIFIC DATA DOCUMENT CORRESPONDING TO THE CLIENT APPLICATION INSTALLED ON THE USER DEVICE

S5040) DISPLAY THE APPLICATION SPECIFIC DATA DOCUMENT IN THE CLIENT APPLICATION

FIG. 5

OMNI-CHANNEL CONTENT MAPPER FRAMEWORK

BACKGROUND

Field

Various example embodiments relate to methods, apparatuses, systems, and/or non-transitory computer readable media for providing an omni-channel content mapper framework, and more particularly, methods, apparatuses, systems, and/or non-transitory computer readable media for generating application-agnostic structured data documents using one or more content mapper plugins for an omni-channel content management database.

Description of the Related Art

Content management system (CMS) platforms are back-end network databases which store content to be consumed (e.g., displayed, read, viewed, heard, etc.) by content consumers (e.g., users) of one of or more client applications, such as smart phone apps, tablet apps, computer software, web browsers, web applications (e.g., Web 2.0 applications, Web 3.0 applications, etc.), enterprise software applications, etc.

Conventional CMS platforms, such as Drupal, Wordpress, Joomla, Wix, etc., provide services wherein content creators may upload content to a back-end content database of the CMS platforms and then "publish" the content for use on one or more "channels," e.g., content channels, consumption channels, communication channels, and/or content distribution media, such as websites, social media applications, video-sharing platforms, etc., using content models and/or client application specific plugins provided by the CMS platforms for each desired channel. However, because the content models are CMS-specific and/or content channel-specific, and are likely to be both CMS- and content channel-specific, the conventional CMS platforms require content be stored in a CMS-specific data format (e.g., a proprietary data format), for example using CMS-specific metadata, etc., and/or require the content to be published in a client application-specific data format, thereby increasing the data size of the content, increasing the network traffic, and/or increasing the processing times to publish the content, etc. Moreover, any changes made to the CMS platform's software and/or the content channel application (e.g., software updates, bug fixes, addition of new technology and/or user features, etc.) require changes be made to the content as well to ensure that the content remains compatible with the CMS platform and/or the content channel application. Additionally, the addition of new content types may require extensive modification of the stored content, the CMS platform and/or any associated content channel-specific applications.

SUMMARY

At least one example embodiment relates to a server.

In at least one example embodiment, the server may include a memory storing computer readable instructions, and processing circuitry configured to execute the computer readable instructions to cause the server to, receive a content request from at least one user device, the content request including a unique content identifier associated with the requested content and desired content type information corresponding to the requested content, determine a desired content mapper (CM) plugin corresponding to the desired content type information from a plurality of CM plugins, obtain content data corresponding to the unique content identifier from a content database, generate an application-agnostic structured data document using the determined content mapper plugin, the application-agnostic structured data document including the obtained content data, and transmit the application-agnostic structured data document to the at least one user device in response to the content request.

Some example embodiments provide that the plurality of CM plugins includes at least one of: a card type CM plugin, a story type CM plugin, an asset type CM plugin, a page type CM plugin, an article summary type CM plugin, a pattern landing page type CM plugin, and a course type CM plugin, and the processing circuitry is further configured to execute the computer readable instructions to cause the server to, format the content data to the desired content type using the determined CM plugin based on at least one desired content type specific attribute included in the content data and at least one desired content type specific rule corresponding to the at least one desired content type specific attribute included in the determined CM plugin.

Some example embodiments provide that the transmitted application-agnostic structured data document causes the at least one user device to, generate an application specific data document corresponding to a client application executed by the at least one user device based on a template corresponding to the desired content type information and the obtained content data, the template including desired content type specific style rules and desired content type specific presentation layer rules, and display the application specific data document in the client application.

Some example embodiments provide that the client application is at least one of a mobile client application, a web-based client application, an enterprise client application, and a web browser.

Some example embodiments provide that the processing circuitry is further configured to execute the computer readable instructions to cause the server to, generate the application-agnostic structured data document by generating a plurality of HTML objects associated with the obtained content data.

Some example embodiments provide that the processing circuitry is further configured to execute the computer readable instructions to cause the server to, cache the plurality of generated HTML objects in a cache database, and transmit the cached plurality of generated HTML objects to a second user device in response to a second content request including the same unique content identifier and the same desired content type information.

Some example embodiments provide that the application-agnostic structured data document is a JavaScript object notation (JSON) document.

Some example embodiments provide that the processing circuitry is further configured to execute the computer readable instructions to cause the server to, generate a preview version of the obtained content data using the determined content mapper plugin, and transmit the generated preview version to the at least one user device, the transmitting the generated preview version causing the at least one user device to display the preview version of the obtained content data on a client application executing on the at least one user device.

At least one example embodiment relates to a method of operating a server.

In at least one example embodiment, the method may include receiving a content request from at least one user device, the content request including a unique content identifier associated with the requested content and desired content type information corresponding to the requested content, determining a desired content mapper (CM) plugin corresponding to the desired content type information from a plurality of CM plugins, obtaining content data corresponding to the unique content identifier from a content database, generating an application-agnostic structured data document using the determined content mapper plugin, the application-agnostic structured data document including the obtained content data, and transmitting the application-agnostic structured data document to the at least one user device in response to the content request.

Some example embodiments provide that the plurality of CM plugins includes at least one of, a card type CM plugin, a story type CM plugin, an asset type CM plugin, a page type CM plugin, an article summary type CM plugin, a pattern landing page type CM plugin, and a course type CM plugin, and the method further comprises, formatting the content data to the desired content type using the determined CM plugin based on at least one desired content type specific attribute included in the content data and at least one desired content type specific rule corresponding to the at least one desired content type specific attribute included in the determined CM plugin.

Some example embodiments provide that the method may further comprise, generating the application-agnostic structured data document by generating a plurality of HTML objects associated with the obtained content data based on a template corresponding to the desired content type information and the obtained content data, the template including desired content type specific style rules and desired content type specific presentation layer rules.

Some example embodiments provide that the method may further comprise, caching the plurality of generated HTML objects in a cache database, and transmitting the cached plurality of generated HTML objects to a second user device in response to a second content request including the same unique content identifier and the same desired content type information.

Some example embodiments provide that the application-agnostic structured data document is a JavaScript object notation (JSON) document.

Some example embodiments provide that the method may further comprise, generating a preview version of the obtained content data using the determined content mapper plugin, and transmitting the generated preview version to the at least one user device, the transmitting the generated preview version causing the at least one user device to display the preview version of the obtained content data on a client application executing on the at least one user device.

At least one example embodiment relates to a non-transitory computer readable medium.

In at least one example embodiment, the non-transitory computer readable medium stores computer readable instructions, which when executed by processing circuitry of a server, causes the server to, receive a content request from at least one user device, the content request including a unique content identifier associated with the requested content and desired content type information corresponding to the requested content, determine a desired content mapper (CM) plugin corresponding to the desired content type information from a plurality of CM plugins, obtain content data corresponding to the unique content identifier from a content database, generate an application-agnostic structured data document using the determined content mapper plugin, the application-agnostic structured data document including the obtained content data, and transmit the application-agnostic structured data document to the at least one user device in response to the content request.

Some example embodiments provide that the plurality of CM plugins includes at least one of a card type CM plugin, a story type CM plugin, an asset type CM plugin, a page type CM plugin, an article summary type CM plugin, a pattern landing page type CM plugin, and a course type CM plugin, and the server is further caused to, format the content data to the desired content type using the determined CM plugin based on at least one desired content type specific attribute included in the content data and at least one desired content type specific rule corresponding to the at least one desired content type specific attribute included in the determined CM plugin.

Some example embodiments provide that the transmitted application-agnostic structured data document causes the at least one user device to, generate an application specific data document corresponding to a client application executed by the at least one user device based on a template corresponding to the desired content type information and the obtained content data, the template including desired content type specific style rules and desired content type specific presentation layer rules, and display the application specific data document in the client application.

Some example embodiments provide that the client application is at least one of a mobile client application, a web-based client application, an enterprise client application, and a web browser.

Some example embodiments provide that the server is further caused to, generate the application-agnostic structured data document by generating a plurality of HTML objects associated with the obtained content data.

Some example embodiments provide that the server is further caused to, cache the plurality of generated HTML objects in a cache database, and transmit the cached plurality of generated HTML objects to a second user device in response to a second content request including the same unique content identifier and the same desired content type information.

BRIEF DESCRIPTION OF THE DRAWINGS

The accompanying drawings, which are incorporated in and constitute a part of the specification, illustrate one or more example embodiments and, together with the description, explain these example embodiments. In the drawings:

FIG. 3B illustrates an example of a client application-agnostic structured data document corresponding to FIG. 3A according to some example embodiments;

FIG. 3C illustrates an example rendered client application-specific document corresponding to FIG. 3B according to some example embodiments;

FIG. 5 illustrates an example method for operation an omni-channel content mapper framework user device according to at least one example embodiment.

DETAILED DESCRIPTION

Figure 1:
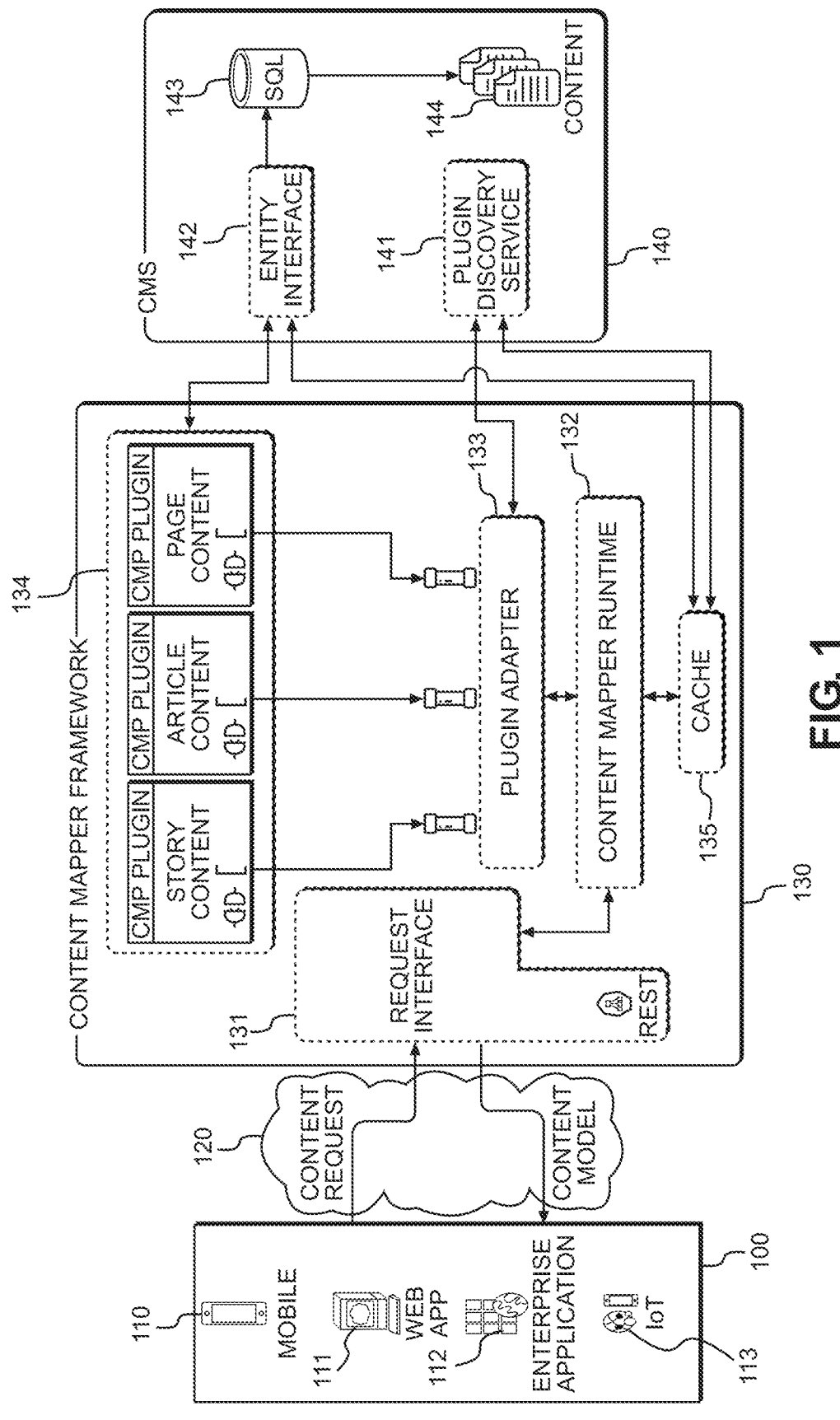
FIG. 1 illustrates an example system associated with an omni-channel content mapper framework according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone, a smart device, and/or server, etc., to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment refers to methods, systems, devices, and/or non-transitory computer readable media for providing an omni-channel content mapper framework for use with one or more CMS platforms and/or for use with a plurality of client applications. The omni-channel content mapper framework provides a component architecture including a plurality of plugin modules which may be used to create, instantiate, and/or expose content entities corresponding to the various client applications on demand. Moreover, the omni-channel content mapper framework further includes a plurality of patterns and templates which allow users to create additional and/or new plugin content entity models to use on a plurality of CMS platform backends, and further allows users to modify and/or update existing plugin content entity models to suit new features, innovations, and the like.

While various example embodiments are discussed in connection with an online brokerage platform for the sake of clarity and convenience, the example embodiments are not limited thereto, and one of ordinary skill in the art would recognize the example embodiments may be applicable to other types of online content management services, enterprise applications, ecommerce services, social media services, social media services, streaming services, gaming services, other web services, apps, and the like.

FIG. 1 illustrates an example system associated with an omni-channel content mapper framework according to at least one example embodiment, but the example embodiments are not limited thereto, and various modifications may be made to the omni-channel content mapper framework (hereinafter referred to as "framework"). As shown in FIG. 1, the online framework system may include a plurality of user devices 100 including a mobile device 110, a personal computer 111, a server 112, an Internet of Things (IoT) device, etc., a network 120, at least one server 130 associated with the framework, and/or at least one server 140 associated with a backend content management system (CMS), but the example embodiments are not limited thereto, and the example embodiments may include a greater or lesser number of constituent elements. For example, the framework server 130 may be combined with the CMS server 140, and/or one or both of the framework server 130 and the CMS server 140 may be distributed across a plurality of servers (e.g., a cloud network, a content distribution network, an edge network, etc.).

Each of the plurality of user devices 100 may allow a respective user to access the framework server 130 via a computer network 120. For example, one or more of the plurality of user devices 100 may have client application(s) (e.g., mobile applications, web applications, enterprise applications, other programs, code, computer readable instructions, etc.) installed and/or may execute software application(s) corresponding to a client application and/or a content channel, etc. As another example, one or more of the plurality of user devices 100 may have installed and/or may execute a web browser application which allows a corresponding user of the user device to access at least one website associated with at least one content channel, etc. For the sake of clarity and brevity, all software for consuming content will be referred to as client application(s) hereinafter. According to some example embodiments, the user devices 100 may include computing devices, such as a personal computer (PC), a laptop, a server, a database system, a smartphone, a tablet, any other smart devices, a wearable device, an Internet-of-Things (IoT) device, a virtual reality (VR) and/or augmented reality (AR) device, a virtual assistant device, a gaming device, etc., but are not limited thereto.

The plurality of user devices 100 and the framework server 130 and/or the CMS server 140 may be connected over the network 120, and the network 120 may correspond to a wireless network, such as a cellular wireless access network (e.g., a 3G wireless access network, a 4G-Long Term Evolution (LTE) network, a 5G-New Radio (e.g., 5G) wireless network, a WiFi network, a satellite network, etc.) and/or a wired network (e.g., a fiber network, a cable network, a PTSN, etc.). The framework server 130 may connect to the CMS server 140 and/or other servers (not shown), over a wired and/or wireless network, and each of the user devices 110, 111, 112, and/or 113 may connect to other user devices over a wired and/or wireless network. The network 120 may refer to the Internet, an intranet, a wide area network, etc.

According to at least one example embodiment, the framework server 130 may execute software (e.g., web applications, enterprise applications, other programs, code, computer readable instructions, etc.) associated with the omni-channel content mapper framework, but is not limited thereto. More specifically, the framework server 130 may provide (e.g., host, serve, etc.) a request interface 131 associated with the application programming interface (API) of the omni-channel content mapper framework, a content mapper runtime 132, a plugin adapter 133, and/or at least one content mapping plugin storage 134 (e.g., memory, etc.), but the framework server 130 is not limited thereto. Additionally, the CMS server 140 may execute software (e.g., software applications, databases, programs, code, computer readable instructions, etc.) associated with the CMS application and/or service, and more specifically, may execute and/or host a plugin discovery service 141, an entity interface 142, at least one content database 143, and/or a plurality of content 144, etc., but is not limited thereto.

Referring now to the framework server 130, the framework server 130 may receive at least one client request from one or more client application executed on one or more of the user devices 100, etc., via the request interface 131. The client request may be formed in accordance with and/or based on the omni-channel content mapper framework API, which provides a set of CMS-agnostic and client application-agnostic definitions and/or protocols for requesting formatted content from the CMS 140, etc. The client request may include a unique content identifier (e.g., a uniform resource identifier (URI), etc.) specifying the content requested from the CMS server 140, a content type identifier specifying the content type requested by the user and/or client application (e.g., article, story, quiz, page, card, asset, article summary, pattern landing page, course, video, audio, image, graphic, survey, game, document, spreadsheet, file, etc.), a client application type identifier identifying the client application type and/or version number being used to consume the requested content (e.g., client application, enterprise application, smart app, web browser, etc.), user device type information, network address information corresponding to the requesting user device, a user identifier and/or user authentication information (e.g., username and password, security key, etc.) for verifying whether the requesting user is allowed access to the content, etc., but the example embodiments are not limited thereto and other information may be included in the client request.

Additionally, the client request may be a request for a list of content available for consumption on the CMS server 140, such as a list of new content uploaded to the database 143, a list of content stored on the database 143 which have been changed, updated, and/or modified, a list of content which has been deleted from the database 143, etc. Further, the client request may include a request for a list of content types available, such as a list of new content types, a list of modified content types, a list of removed content types, etc. In the event that content types have been added, modified, and/or removed, the framework server 130 may additionally return program code and/or computer readable instructions for implementing the new, modified, and/or deleted content type(s) in the client application of the requesting user device in response to the client request, etc., but the example embodiments are not limited thereto. For example, the user device may download updates to the client application from a separate server and/or service, etc.

According to some example embodiments, the client request may also be a preview request for a specified and/or desired content. A preview request is a request to be presented with a preview version, e.g., a not finalized and/or not published version of the specified content for a specified client application type, which is viewable on an internal (e.g., private, non-public) platform and/or an internal computing device, etc., and not on a public website, public client device, etc. For example, the preview version may be viewed prior to publication of the finalized version of the specified content on an external website, on external computing devices, on client-facing web applications, etc., for reviewing, proof-reading and/or editing purposes, etc., and may only be accessible by a computing device connected to an intranet, a private network, etc.

Once the client request is received by the request interface 131, the client request is forwarded to the content mapper runtime 132 for processing. The content mapper runtime 132 may be a representational state transfer (REST) endpoint of the omni-channel framework API, and may authenticate the client request by parsing the client request for the request type, content identifier and/or the desired content type information, etc., and determining whether the client request is a valid request. In some example embodiments, the content mapper runtime 132 may also verify the user identifier and/or authenticate the user authentication information to determine whether the user is a valid user and/or authorized user and has permission to access and/or modify the requested content, but the example embodiments are not limited thereto.

In response to parsing the type of request (e.g., a request for content, a request for a list of content, a request for a list of available content types, a preview request, etc.), the content mapper runtime 132 may forward the content identifier and the desired content type of the client request to the plugin adapter 133, may request a list of available content types from the plugin discovery service 141, may request a list of content from the entity interface 142, etc., but is not limited thereto. For example, if the client request indicates that a "story" content has been requested, the content mapper runtime may transmit a content request to the plugin adapter 133, the content request including the requested content identifier and the requested content type identifier, etc. The plugin adapter 133 may then determine whether the "story" content mapping plugin (CMP) has been loaded to the CMP storage 134, and if it has not been loaded into the CMP storage 134, the plugin adapter 133 may transmit a request for the "story" plugin type from the plugin discovery service 141, etc. Once the "story" CMP has been loaded into the CMP storage 134, the CMP then transmits a request for the requested content from the CMS server 140 via the entity interface 142. The entity interface 142 may be another REST endpoint of the omni-channel framework API, and may then retrieve the requested content from the content database 143 based on the requested content identifier. As previously mentioned, the content stored in the content database 143 may be client application agnostic, meaning that the content may not be formatted for viewing, loading, and/or playing on any specific client application type, such as a web application, mobile application, enterprise application, web browser, streaming service, etc. but the example embodiments are not limited thereto. For example, if the stored content corresponds to an article, the content may be stored as plaintext, without graphical user interface formatting and/or webpage styling, etc. However, the example embodiments are not limited thereto, and for example, the stored content may further include metadata and the like associated with, e.g., a specific type of CMS, such as Drupal, Wordpress, Joomla, Wix, etc. In this situation, the entity interface 142 may strip and/or remove the retrieved content of the CMS-specific metadata, etc., such that the returned stored content is CMS-agnostic, etc. According to at least one example embodiment, the entity interface 142 may strip the CMS-specific metadata using a desired set of rules, such as desired regular expressions, trained machine learning, etc.

Additionally, the requested content may be linked with other content, e.g., a story content may be linked to one or more text content, video content, audio content, image content, graphics content, quiz content, survey content, etc., and the content database 143 may return the linked and/or associated content with the requested content to the story CMP 134 via the entity interface 142.

Next, the appropriate CMP 134, e.g., the story plugin, may format, translate, and/or map the CMS-agnostic content (e.g., data) into a data model and/or payload corresponding to the requested content type. More specifically, the CMP 134 may translate the content data into a client application-agnostic formatted structured data document corresponding to the content type of the CMP 134, such as a JSON payload, a HTML document, a CSS document, a XLT document, a XML document, a Python document, a PHP document, plaintext, etc., and/or any combinations thereof, which may be interpreted by any type of client application into the requested content type instance for display and/or execution of the specific client application, but the example embodiments are not limited thereto. The client application-agnostic formatted structured data document will be discussed in greater detail in connection with FIGS. 3A to 3C.

Once the appropriate CMP 134 has formatted the retrieved content into the requested content type, e.g., the story CMP formats the retrieved content into a story data document, etc., the CMP 134 transmits the client application-agnostic formatted data document to the content mapper runtime 132, which in turn transmits the formatted data document to the requesting user device 100. Additionally, according to some example embodiments, the content mapper runtime 132 may store the client application-agnostic formatted data document in a cache memory 135 based on a desired cache policy. Consequently, when a new client request is received by the content mapper runtime 132 for the cached content identifier/content type, the content mapper runtime 132 may quickly return the cached formatted data document, etc.

Further, once the requesting user device 100 receives the client application-agnostic formatted structured data document, the client application of the requesting user device 100 may interpret and natively display and/or play, etc., the client application-agnostic formatted structured data document. More specifically, the client application may parse the data document, e.g., the JSON document, the HTML document, and/or CSS document, etc., and display the payload of the JSON, etc., document on the user device. The client application-agnostic formatted structured data document will be discussed in greater detail in connection with FIGS. 3A to 3C.

While certain components of a system associated with omni-channel content mapper framework are shown in FIG. 1, the example embodiments are not limited thereto, and the system may include components other than that shown in FIG. 1, which are desired, necessary, and/or beneficial for operation of the underlying networks within the system, such as base stations, access points, switches, routers, nodes, servers, gateways, etc.

Figure 2:
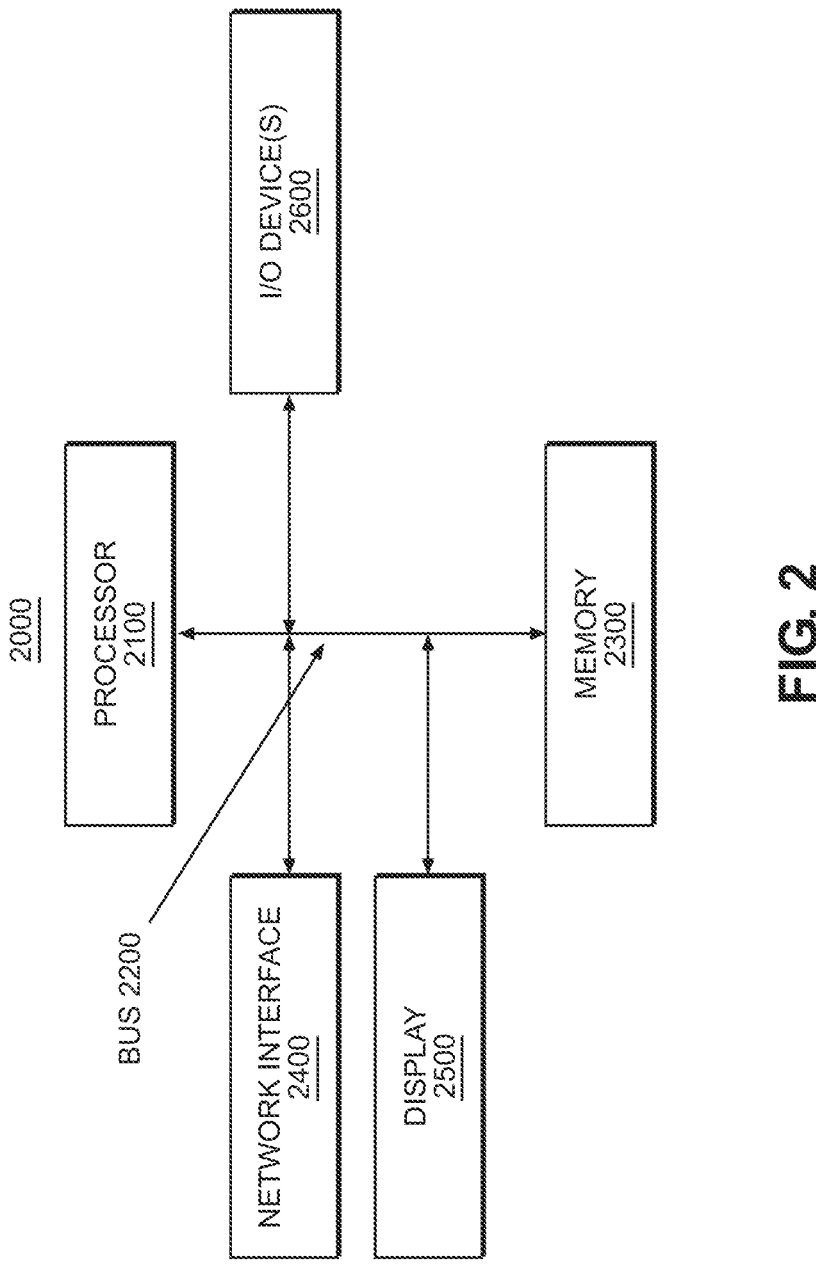
FIG. 2 illustrates a block diagram of an example computing device of the omni-channel content mapper framework according to at least one example embodiment.

FIG. 2 illustrates a block diagram of an example computing device of the online trading platform according to at least one example embodiment. The computing device 2000 of FIG. 2 may correspond to the framework server 130, the CMS server 140, and/or one or more of the plurality of user devices 100 of FIG. 1, but the example embodiments are not limited thereto.

Referring to FIG. 2, a computing device 2000 may include processing circuitry, such as the at least one processor 2100, at least one communication bus 2200, a memory 2300, at least one network interface 2400, and/or at least one input/output (I/O) device 2500 (e.g., a keyboard, a touchscreen, a mouse, a microphone, a camera, a speaker, etc.), etc., but the example embodiments are not limited thereto. For example, the computing device 2000 may further include a display panel 2500, such as a monitor, a touchscreen, etc. The memory 2300 may include various special purpose program code including computer executable instructions which may cause the computing device 2000 to perform the one or more of the methods of the example embodiments, including but not limited to computer executable instructions related to the omni-channel content mapper framework API, the content mapping, CMS service, etc.

In at least one example embodiment, the processing circuitry may include at least one processor (and/or processor cores, distributed processors, networked processors, etc.), such as the at least one processor 2100, which may be configured to control one or more elements of the computing device 2000, and thereby cause the computing device 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire computing device 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the framework server 130, the CMS server 140, and/or the computing device 2000, such as the methods discussed in connection with FIGS. 4 to 5, the at least one network interface 2400, and/or at least one I/O device 2500, etc. Such software elements may be loaded from a non-transitory computer-readable storage medium independent of the memory 2300, using a drive mechanism (not shown) connected to the computing device 2000, or via the at least one network interface 2400, and/or at least one I/O device 2500, etc.

In at least one example embodiment, the at least one communication bus 2200 may enable communication and/or data transmission to be performed between elements of the computing device 2000. The bus 2200 may be implemented using a high-speed serial bus, a parallel bus, and/or any other appropriate communication technology. According to some example embodiments, the computing device 2000 may include a plurality of communication buses (not shown).

Additionally, the computing device 2000 may also provide content, communication, and/or messaging services for the one or more users of the content providing service which allows users to receive and/or consume content (e.g., read articles, view stories, view videos, listen to podcasts, etc.), interact with content (e.g., via surveys, quizzes, games, etc.), to contact and/or message one or more other users of the content providing service via the computing device 2000. For example, the computing device 2000 may also provide an online community (e.g., a forum, a website, a portal, a discussion board, an investment advisor service, a group chat service, a teleconference service, a videoconference service, etc.) wherein users of the content providing service may transmit messages for content creators, employees of the content providing service, other users of the content providing service, or a subset of the users of the online trading platform.

According to at least one example embodiment, the computing device 2000 may host an online trading platform providing users with the ability to perform securities transactions, e.g., purchases of stocks, sales of stocks, purchase and/or sales of options contracts, obtaining loans for purchasing stocks, etc., but the example embodiments are not limited thereto, and for example, the online trading platform is not limited to stocks, and may include other classes and/or categories of securities, other classes and/or categories of transactions, etc. Additionally, the computing device 2000 may provide banking services, may host articles, stories, shows, podcasts, and/or other content related to financial news, domestic news, international news, etc., may provide online seminars related to financial services and/or education, etc.

While FIG. 2 depicts an example embodiment of a computing device 2000, the computing device 2000 is not limited thereto, and may include additional and/or alternative architectures that may be suitable for the purposes demonstrated. For example, the functionality of the computing device 2000 may be divided among a plurality of physical, logical, and/or virtual server and/or computing devices, network elements, etc., but the example embodiments are not limited thereto.

Figure 3A:
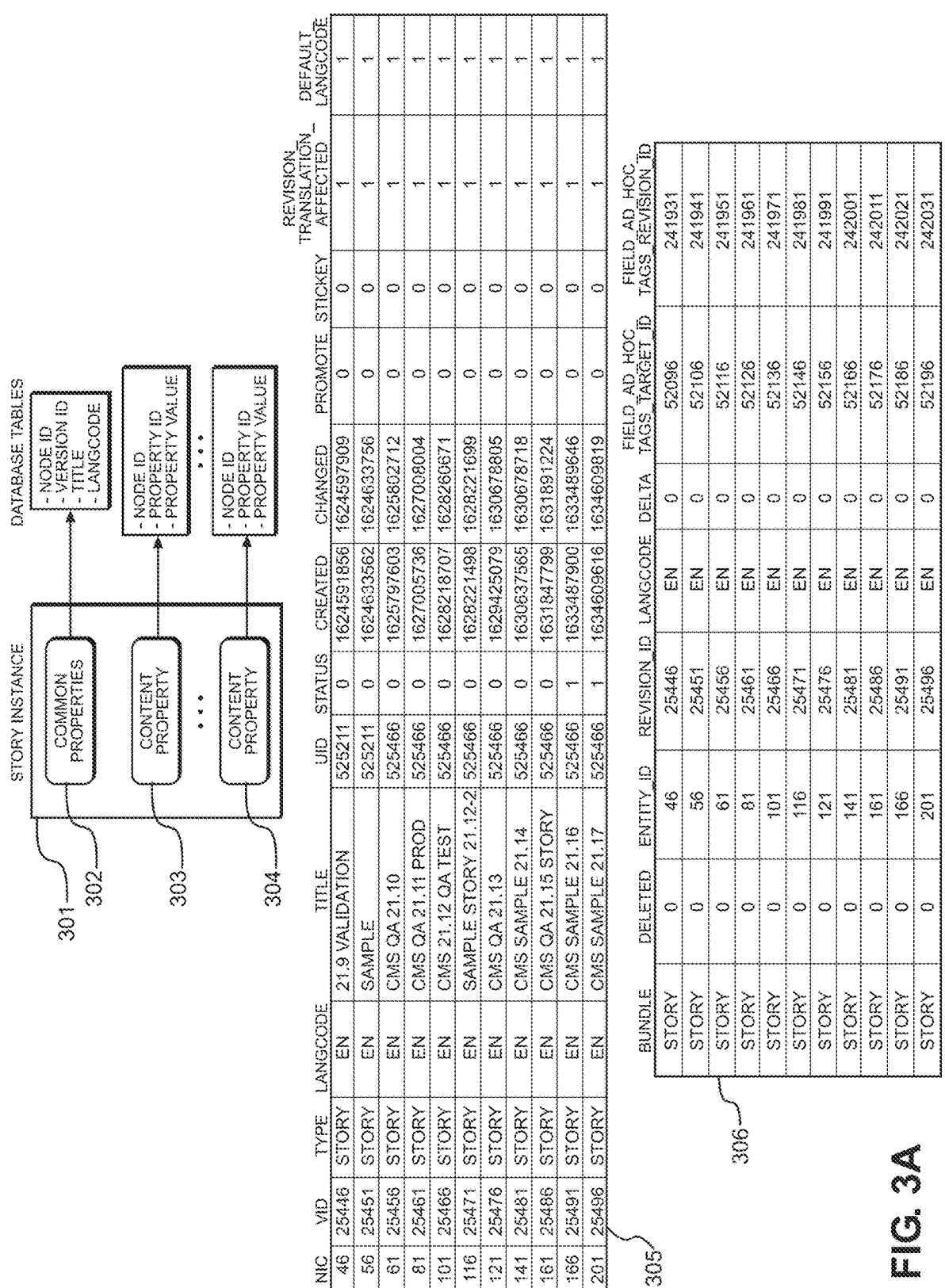
FIG. 3A illustrates an example of content data containing CMS-specific metadata according to some example embodiments.

FIG. 3A to 3C illustrate example structured data documents according to some example embodiments. More specifically, FIG. 3A illustrates an example of a "story" content type data document containing CMS-specific metadata according to some example embodiments; FIG. 3B illustrates a client application-agnostic structured data document version of the example story content shown in FIG. 3A according to some example embodiments; and FIG. 3C illustrates an example of a rendered client application-specific document corresponding to the story content of FIG. 3B according to some example embodiments. However, the example embodiments are not limited thereto, and for example, other content types may be used, etc.

Referring now to FIG. 3A, according to at least one example embodiment, a content database 143 may store at least one content data document 301 (e.g., content, etc.), which may act as a template for the rendered content data document, and at least one attribute and/or component 302 to 304, etc., associated with the content data document 301, but is not limited thereto, and for example, may include a greater or lesser number of attributes and/or components, etc. As shown in FIG. 3A, the content 301 stored in the content database 143 may be a "story" content type data document, but the example embodiments are not limited thereto, and for example, the content data document 301 may be a different content type, such as card type, asset type, article summary type, pattern landing page type, course type, quiz type, video type, audio type, image type, graphic type, survey type, game type, document type, spreadsheet type, file type, etc. Additionally, the attributes and/or components 302 to 304 associated with the content data document 301 may be CMS-specific metadata which correspond to and/or are associated with data stored in database tables (e.g., SQL tables) 305 and 306, etc., stored in the content database 143. For example, the example story instance 301 may include, for example, one or more common components and/or general components (e.g., "Common Properties" in FIG. 3A) associated with all content types, wherein the data associated with the common components may be stored in the database table 305, etc., and one or more content-specific attributes (e.g., "Content Property" in FIG. 3A) with data associated with the content-specific attributes stored in the database table 306, etc., but the example embodiments are not limited thereto, and for example, there may be a single database table storing data for both common components and content-specific attributes, or more than two database tables, etc. Each of the common components and/or each of the content-specific attributes 302 to 304 may be resource locators, links, identifiers associated with, pointers, etc., pointing to additional data (e.g., content data such as text for the story, images for the story, videos for the story, audio for the story, graphs for the story, accessibility data (e.g., text-to-speech data, etc.) for the story, stock ticker information associated with the story, etc.) associated with, to be included in, and/or to populate the rendered content data document, but is not limited thereto. As shown in FIG. 3A, the resource locators (e.g., the "node ID", "version ID", "property ID", "entity ID", etc.) may be used to look up specific data (e.g., "property value", etc.) for the content data document 301 in one or more database tables included in the content database 143, such as database tables 305 to 306, etc., but the example embodiments are not limited thereto.

In other words, the story object may include a plurality of common components and/or content-specific attributes, which are defined by and/or required by the template of the story content type. For example, the story content type may include the following components (e.g., common properties): Title (e.g., (1) of FIGS. 3B to 3C), Date (e.g., (2) of FIGS. 3B to 3C), etc., and may further include the following attributes (e.g., content property): Summary (e.g., (3) of FIGS. 3B to 3C), Featured Media (e.g., (4) of FIGS. 3B to 3C), at least one Text Component (e.g., (5) to (7) of FIGS. 3B to 3C), and at least one Disclosure component (e.g., (8) of FIGS. 3B to 3C, which may be specific to the story content type and/or the desired story, but the example embodiments are not limited thereto, and for example, other attributes and/or components may be included in the story object type. Moreover, other content types may include one or more of the same or different attributes and/or components, etc.

Referring now to FIG. 3B, the story content 144 retrieved from the database 143 may be formatted, translated, and/or mapped by a story CMP 134 into a data model and/or payload corresponding to the story content type. More specifically, the story CMP 134 may translate the content data shown in FIG. 3A into a client application-agnostic formatted structured data document corresponding to FIG. 3B, wherein the corresponding Title data from the retrieved content is formatted into the Title attribute (1) of FIG. 3B, the Date data is formatted into the Date attribute (2) of FIG. 3B, the Summary data is formatted into the Summary attribute (3) of FIG. 3B, the Featured Media data is formatted into the Featured Media (4) attribute of FIG. 3B, the Text data is formatted into the Text attributes (5) to (7) of FIG. 3B, and/or the Disclosure data is formatted into the Disclosure attribute (8) of FIG. 3B, but the example embodiments are not limited thereto.

Additionally, according to some example embodiments, if the content 144 stored in the database 143 does not include one or more desired and/or required attributes and/or components of the requested content type, the CMP 134 may automatically generate and/or provide the missing attribute and/or component. For example, the stored content 144 does not include a "Title" and/or "Summary," etc., the story CMP 134 may generate and/or input the title data and/or summary data into the generated client-application agnostic structured data document based on textual and/or contextual analysis of the "Text" data using natural language processing and trained machine learning, etc., but the example embodiments are not limited thereto.

Referring now to FIG. 3C, according to some example embodiments, the story CMP 134 then transmits the client application-agnostic formatted data document to the content mapper runtime 132, which in turn transmits the formatted data document to the requesting user device 100. Then, the client application of the requesting user device 100 may interpret and natively display and/or play, etc., the client application-agnostic formatted structured data document shown in FIG. 3B. For example, the client application may convert and/or render the client application-agnostic formatted data document of FIG. 3B into a HTML document and display an HTML as shown in FIG. 3C.

Figure 4:
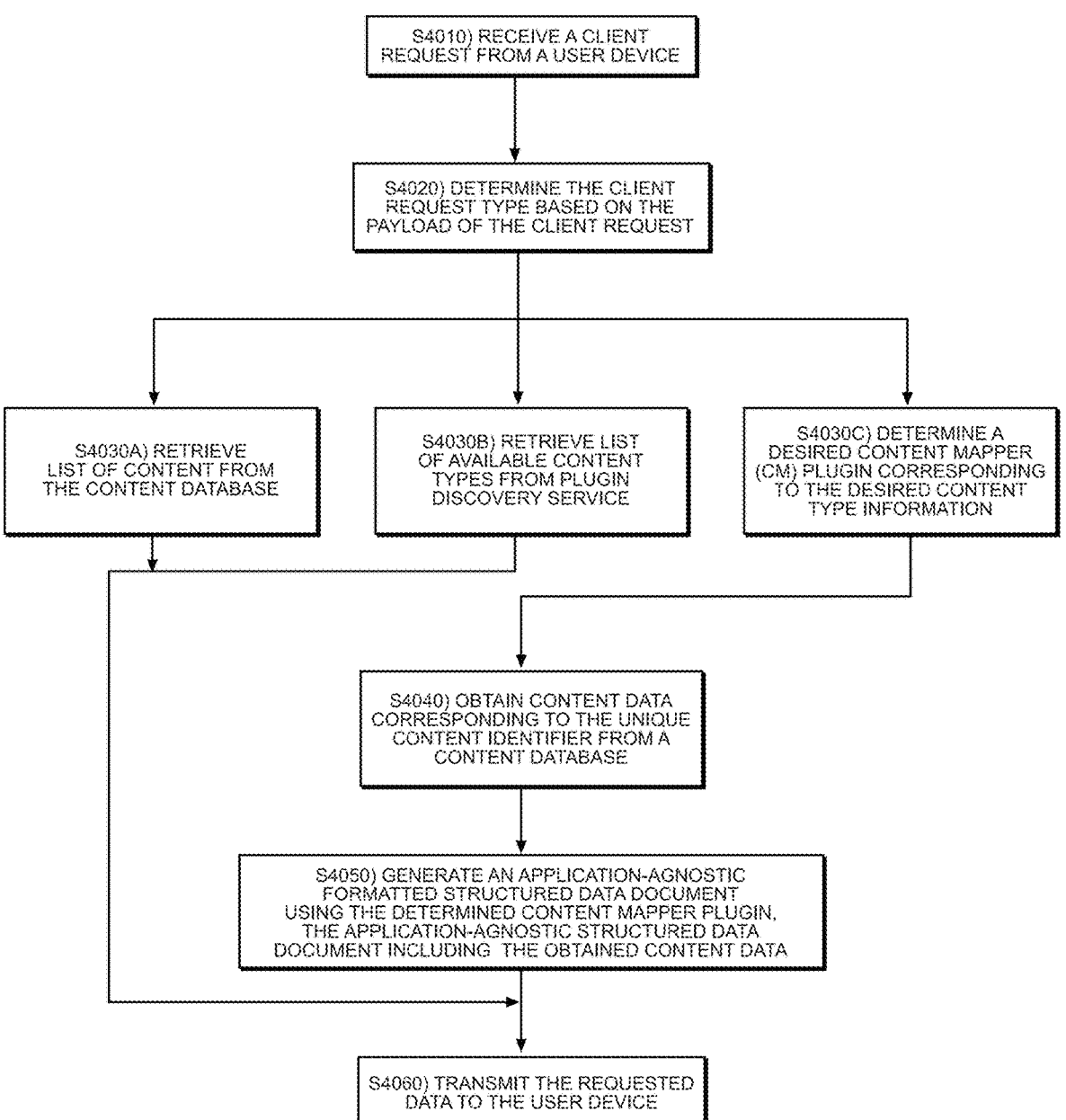
FIG. 4 illustrates an example method for operating an omni-channel content mapper framework server according to at least one example embodiment.

FIG. 4 illustrates an example method for operating an omni-channel content mapper framework server according to at least one example embodiment. The framework server may correspond to the framework server 130 of FIG. 1, but the example embodiments are not limited thereto.

Referring now to FIG. 4, according to at least one example embodiment, in operation S4010, the framework server 130 may receive a client request from a user device, e.g., one or more of the user devices 110 to 113 of FIG. 1, but is not limited thereto. The client request may include request type information, e.g., a request for content, a request for a list of content, a request for a list of available content types, etc., but the example embodiments are not limited thereto. For example, if the client request is a request for content, the request may include a unique content identifier associated with the desired content, desired content type information (e.g., card type, story type, asset type, article summary type, pattern landing page type, course type, quiz type, video type, audio type, image type, graphic type, survey type, game type, document type, spreadsheet type, file type, etc.) associated with the desired content, a client application type associated with the client application type and/or version number intended to be used to consume the requested content (e.g., client application type, enterprise application type, mobile application type, web browser type, etc.), user device type information, network address information corresponding to the requesting user device, a user identifier and/or user authentication information (e.g., username and password, security key, etc.), but the example embodiments are not limited thereto.

For example, a card type is a user interface (UI) element which groups related content information, such as an image, description, and/or links, etc., but is not limited thereto. The UI elements included in the card may be visually presented and/or rendered in a manner similar to a playing card, and/or in a manner especially suited for viewing on a smartphone or similar dimensioned user device, but is not limited thereto. A story is a content type (e.g., an article content type, etc.) which is similar to a traditional website article and/or blog post, etc., and may include content data such as financial education content, editorial content, etc., but the example embodiments are not limited thereto. An asset content type refers to a chunk of text which may be displayed anywhere within a client application, e.g. contact information for a business, a disclosure copy text, a disclaimer copy text, a form, etc.

Additional examples include the Article Summary content type which provides a list of stories and/or articles available, wherein each listed story and/or article may further include a desired set of attributes (e.g., a desired amount of content extracted from) from the corresponding story/article instance. A Pattern Landing Page content type is a web page which is created using individual attributes and/or components from a design system set of available components. The pattern landing page content type allows a method of assembling a page using separate attributes and/or components instead of the traditional complete build-out of the page. The Course content type and the Quiz content type may be part of an education content curriculum, wherein the course is a collection of educational modules and/or lessons and the quiz content type may be quizzes and/or tests which may be used for assessments related to the educational content of the corresponding course.

Each of the desired content types includes a content specific rendering template (e.g., a layout template and/or style template, etc.) and/or content specific rule set which provide mapping information and/or formatting rules between UI elements (e.g., attributes, components, etc.) found in the client-application agnostic structured data document and the client application-specific data document, etc.

In operation S4020, the framework server 130 may determine the client request type based on the payload of the client request, e.g., the request type of the client request. If the framework server 130 determines that the client request corresponds to a request for a list of content, in operation S4030A, the framework server 130 may request a list of all available content from the CMS server 140 and/or the content database 143, etc. Further, the framework server 130 may request a list of new content uploaded to the database 143, a list of content stored on the database 143 which have been changed, updated, and/or modified, a list of content which has been deleted from the database 143, etc.

In operation S4030B, if the framework server 130 determines the client request corresponds to a request for a list of available content types, the framework server 130 transmits a request to the CMS server 140 and/or the plugin discovery service 141 for a list of content types available, such as a list of new content types, a list of modified content types, a list of removed content types, etc.

Following either operation S4030A or S4030B, once the framework server 130 receives the requested list of content and/or list of available content types, the framework server 130 transmits the requested data to the user device 100 (S4060). In the event that content types have been added, modified, and/or removed, in operation S4060, the framework server 130 may additionally return program code and/or computer readable instructions for implementing the new, modified, and/or deleted content type(s) in the client application of the requesting user device in response to the client request, etc., but the example embodiments are not limited thereto.

In operation S4030C, if the framework server 130 determines the client request corresponds to a request for content, the framework server 130 may determine a desired content mapper plugin (CMP) corresponding to the desired content type information included in the client request. More specifically, the framework server 130 may determine whether the desired CMP is loaded into the CMP storage 134, and if not, the framework server 130 may request the desired CMP from the plugin discovery service 141 and/or the CMS server 140, etc.

In operation S4040, the framework server 130 may request the desired content from the content database 143 and/or the CMS server 140 based on the unique content identifier of the desired content. In operation S4050, the framework server 130 may generate a client application-agnostic structured data document using the desired CMP and the desired content. Then, in operation S4060, the framework server 130 may transmit the generated structured data document to the requesting client device.

FIG. 5 illustrates an example method for operation an omni-channel content mapper framework user device according to at least one example embodiment. The user device may correspond to one or more of the user devices 100 in FIG. 1, but the example embodiments are not limited thereto.

According to at least one example embodiment, in operation S5010, the client application executed on a user device 100 may transmit a client request to a framework server, such as framework server 130. The client request may include desired client request type information (e.g., a request for content, a request for a list of content, a request for a list of available content types, a request for a preview version of a desired content, etc.), user identifier information and/or user authentication information, but the example embodiments are not limited thereto. Additionally, the client request may also include desired content type information (e.g., card type, story type, asset type, page type, article summary type, pattern landing page type, course type, quiz type, video type, audio type, image type, graphic type, survey type, game type, document type, spreadsheet type, file type, etc.), a client application type associated with the client application type and/or version number intended to be used to consume the requested content (e.g., client application type, enterprise application type, mobile application type, web browser type, etc.), user device type information, network address information corresponding to the requesting user device, a user identifier and/or user authentication information (e.g., username and password, security key, etc.), but the example embodiments are not limited thereto. Moreover, the user device 100 may format the client request in accordance with and/or based on the omni-channel content mapper framework API.

In operation S5020, the user device 100 may receive a client application-agnostic structured data document from the framework server 130 in response to the client request. For example, the received structured data document may be a JSON document generated by the framework server 130 based on the requested content type information indicated in the client request and the requested content data indicated in the client, but is not limited thereto. Moreover, in operation S5030, the client application of the user device 100 may interpret and/or parse the structured data document (e.g., the client application agnostic JSON document shown in FIG. 3B) and generate a client application-specific data document corresponding to the client application type installed on the user device. For example, the user device 100 may generate an HTML webpage based on the structured data document for viewing on a web browser (e.g., such as the HTML webpage shown in FIG. 3C), the user device 100 may generate a presentation file representing the content for viewing the structured data document on a smartphone app, tablet app, mobile app, IoT app, etc.

In operation S5040, the user device 100 then displays the generated client application-specific document on the desired client application.

While FIGS. 4 to 5 illustrate various methods for using an omni-channel content mapper framework for generating application-agnostic and CMS-agnostic data documents for display on a user device, the example embodiments are not limited thereto, and other methods may be used and/or modifications to the methods may be used to perform the generation of application-agnostic and CMS-agnostic data documents of the example embodiments.

Various example embodiments are directed towards an improved device, system, method and/or non-transitory computer readable medium for providing an omni-channel content mapper framework for use with one or more CMS platforms and/or for use with a plurality of client applications. According to at least one example embodiment, the omni-channel content mapper framework provides a component architecture including a plurality of plugin modules which may be used to create, instantiate, and/or expose content entities corresponding to the various client application types on demand. Additionally, the omni-channel content mapper framework further includes a plurality of patterns and templates which allow users to create additional and/or new plugin content entity models to use on a plurality of CMS platform backends, and further allows users to modify and/or update existing plugin content entity models to suit new features, innovations, and the like. Because each plugin is a self-contained unit with annotated configuration data that allows an efficient way of managing the implementation and runtime execution of the plugin, a user may add new plugins to handle new content types and/or modify existing plugins to accommodate changes to current content type models. Because the omni-channel content mapper framework provides core functionality and a pattern of approach, developers are able to focus primarily and/or solely on the plugin logic, thereby enhancing content type change management.

This written description uses examples of the subject matter disclosed to enable any person skilled in the art to practice the same, including making and using any devices, systems, and/or non-transitory computer readable media, and/or performing any incorporated methods. The patentable scope of the subject matter is defined by the claims, and may include other examples that occur to those skilled in the art. Such other examples are intended to be within the scope of the claims.

What is claimed is:

1. A server for providing content to client applications, the server comprising:

a memory storing computer readable instructions; and
processing circuitry configured to execute the computer readable instructions to cause the server to, receive, by the server, a content request from at least one user device, the content request including a unique content identifier associated with the requested content and desired content type information corresponding to the requested content specifying one of a plurality of types of content presentation formats, determine, by the server, a desired content mapper (CM) plugin corresponding to the desired content type information from a plurality of CM plugins stored in a server-side plugin repository that each are configured to format content according to different content type-specific rules and attributes associated with respective ones of plurality of types of content presentation formats, obtain, by the server, content data corresponding to the unique content identifier from a content database, generate, by the server, an application-agnostic structured data document using the determined content mapper plugin, the application-agnostic structured data document including the obtained content data and formatted for omni-channel delivery across a plurality of client application types including at least mobile applications and web-based applications, and transmit the application-agnostic structured data document to the at least one user device in response to the content request, wherein the application-agnostic structured data document transmitted from the server to the at least one user device includes the obtained content data without graphical user interface formatting or webpage styling and enables the at least one user device i) to generate an application specific data document based on the application-agnostic structured data document and a client-side template corresponding to the desired content type information, the application specific data document corresponding to a desired type of a client application installed on the at least one user device from a plurality of types of client applications, and the client-side template including desired content type specific style rules and desired content type specific presentation layer rules, and ii) to display the application specific data document in the client application.

2. The server of claim 1, wherein the plurality of CM plugins includes at least one of:

a card type CM plugin, a story type CM plugin, an asset type CM plugin, a page type CM plugin, an article summary type CM plugin, a pattern landing page type CM plugin, and a course type CM plugin; and the processing circuitry is further configured to execute the computer readable instructions to cause the server to:

format the content data to the desired content type using the determined CM plugin based on at least one desired content type specific attribute included in the content data and at least one desired content type specific rule corresponding to the at least one desired content type specific attribute included in the determined CM plugin.

3. The server of claim 1, wherein the client application is at least one of the mobile application, the web-based application, an enterprise client application, and a web browser.

4. The server of claim 1, wherein the processing circuitry is further configured to execute the computer readable instructions to cause the server to:

generate the application-agnostic structured data document by generating a plurality of HTML objects associated with the obtained content data.

5. The server of claim 4, wherein the processing circuitry is further configured to execute the computer readable instructions to cause the server to:

cache the plurality of generated HTML objects in a cache database; and transmit the cached plurality of generated HTML objects to a second user device in response to a second content request including the same unique content identifier and the same desired content type information.

6. The server of claim 1, wherein the application-agnostic structured data document is a JavaScript object notation (JSON) document.

7. The server of claim 1, wherein the processing circuitry is further configured to execute the computer readable instructions to cause the server to:

generate a preview version of the obtained content data using the determined content mapper plugin; and transmit the generated preview version to the at least one user device, the transmitting the generated preview version causing the at least one user device to display the preview version of the obtained content data on a client application executing on the at least one user device.

8. A method of operating a server, the method comprising:

receiving, by the server, a content request from at least one user device, the content request including a unique content identifier associated with the requested content and desired content type information corresponding to the requested content specifying one of a plurality of types of content presentation formats;

determining, by the server, a desired content mapper (CM) plugin corresponding to the desired content type information from a plurality of CM plugin stored in a server-side plugin repository that each are configured to format content according to different content type-specific rules and attributes associated with respective ones of plurality of types of content presentation formats;

obtaining, by the server, content data corresponding to the unique content identifier from a content database;

generating, by the server, an application-agnostic structured data document using the determined content mapper plugin, the application-agnostic structured data document including the obtained content data and formatted for omni-channel delivery across a plurality of client application types including at least mobile applications and web-based applications; and transmitting, by the server, the application-agnostic structured data document to the at least one user device in response to the content request, wherein the application-agnostic structured data document transmitted from the server to the at least one user device includes the obtained content data with-out graphical user interface formatting or webpage styling and includes the obtained content data without graphical user interface formatting or webpage styling and enables the at least one user device i) to generate an application specific data document based on the application-agnostic structured data document and a client-side template corresponding to the desired content type information, the application specific data document corresponding to a desired type of a client application installed on the at least one user device from a plurality of types of client applications, and the client-side template including desired content type specific style rules and desired content type specific presentation layer rules, and ii) to display the application specific data document in the client application.

9. The method of claim 8, wherein the plurality of CM plugins includes at least one of:

a card type CM plugin, a story type CM plugin, an asset type CM plugin, a page type CM plugin, an article summary type CM plugin, a pattern landing page type CM plugin, and a course type CM plugin; and the method further comprises:

formatting the content data to the desired content type using the determined CM plugin based on at least one desired content type specific attribute included in the content data and at least one desired content type specific rule corresponding to the at least one desired content type specific attribute included in the determined CM plugin.

10. The method of claim 9, the method further comprising:

caching the plurality of generated HTML objects in a cache database; and transmitting the cached plurality of generated HTML objects to a second user device in response to a second content request including the same unique content identifier and the same desired content type information.

11. The method of claim 8, wherein the application-agnostic structured data document is a JavaScript object notation (JSON) document.

12. The method of claim 8, the method further comprising:

generating a preview version of the obtained content data using the determined content mapper plugin; and transmitting the generated preview version to the at least one user device, the transmitting the generated preview version causing the at least one user device to display the preview version of the obtained content data on a client application executing on the at least one user device.

13. A non-transitory computer readable medium storing computer readable instructions, which when executed by processing circuitry of a server, causes the server to:

receive, by the server, a content request from at least one user device, the content request including a unique content identifier associated with the requested content and desired content type information corresponding to the requested content specifying one of a plurality of types of content presentation formats;

determine, by the server, a desired content mapper (CM) plugin corresponding to the desired content type information from a plurality of CM plugins stored in a server-side plugin repository that each are configured to format content according to different content type-specific rules and attributes associated with respective ones of plurality of types of content presentation formats;

obtain content data corresponding to the unique content identifier from a content database;

generate, by the server, an application-agnostic structured data document using the determined content mapper plugin, the application-agnostic structured data document including the obtained content data and formatted for omni-channel delivery across a plurality of client application types including at least mobile application and web-based applications; and transmit, by the server, the application-agnostic structured data document to the at least one user device in response to the content request, wherein the application-agnostic structured data document content data without graphical user interface formatting or webpage styling and includes the obtained content data without graphical user interface formatting or webpage styling and enables the at least one user device i) to generate an application specific data document based on the application-agnostic structured data document and a client-side template corresponding to the desired content type information, the application specific data document corresponding to a desired type of a client application installed on the at least one user device from a plurality of types of client applications, and the client-side template including desired content type specific style rules and desired content type specific presentation layer rules, and ii) to display the application specific data document in the client application.

14. The non-transitory computer readable medium of claim 13, wherein the plurality of CM plugins includes at least one of:

a card type CM plugin, a story type CM plugin, an asset type CM plugin, a page type CM plugin, an article summary type CM plugin, a pattern landing page type CM plugin, and a course type CM plugin; and the server is further caused to:

format the content data to the desired content type using the determined CM plugin based on at least one desired content type specific attribute included in the content data and at least one desired content type specific rule corresponding to the at least one desired content type specific attribute included in the determined CM plugin.

15. The non-transitory computer readable medium of claim 13, wherein the client application is at least one of a mobile client application, a web-based client application, an enterprise client application, and a web browser.

16. The non-transitory computer readable medium of claim 13, wherein the server is further caused to:

generate the application-agnostic structured data document by generating a plurality of HTML objects associated with the obtained content data.

17. The non-transitory computer readable medium of claim 16, the server is further caused to:

cache the plurality of generated HTML objects in a cache database; and transmit the cached plurality of generated HTML objects to a second user device in response to a second content request including the same unique content identifier and the same desired content type information.

* * * * *